C. B. Fitch
Cutting Tenons
№ 9,778. Patented Jun. 14. 1853.
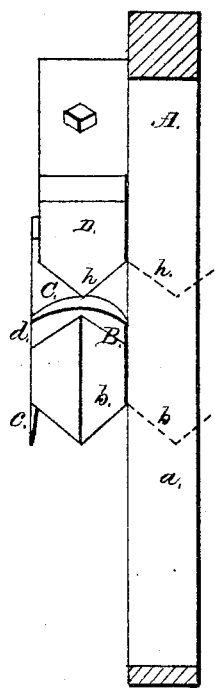
Fig: 2.
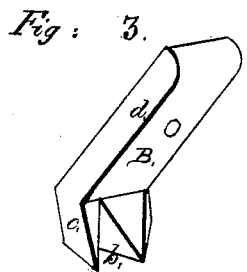
Fig: 3.
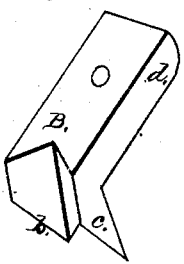
Fig: 4.
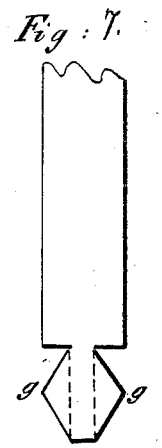
Fig: 7.
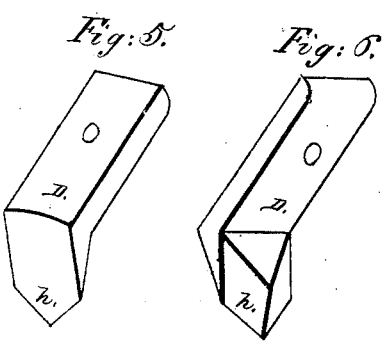
Fig: 5. Fig: 6.

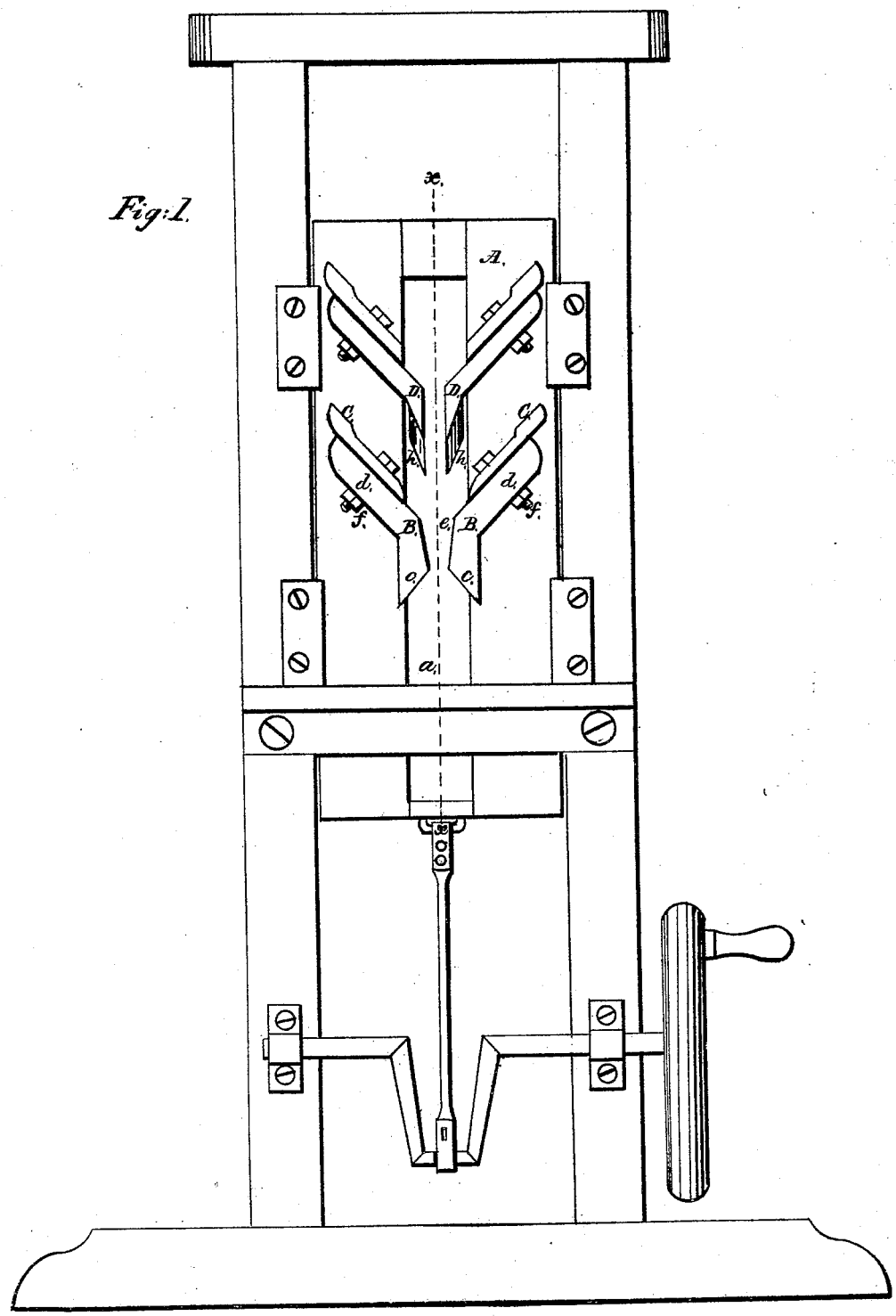

UNITED STATES PATENT OFFICE.

CHARLES B. FITCH, OF GALENA, ILLINOIS.

MODE OF CUTTING TENONS.

Specification of Letters Patent No. 9,778, dated June 14, 1853.

*To all whom it may concern:*

Be it known that I, CHARLES B. FITCH, of Galena, in the county of Jo Daviess and State of Illinois, have invented a certain new and useful Improvement in Cutting Apparatus of Tenoning-Machines, of which the following is a full, clear, and exact description, reference being had to the accompanying drawing, which forms part of this specification, and in which—

Figure 1 represents a front elevation of an ordinary tenoning machine having my improved cutting devices attached thereto. Fig. 2 is a vertical transverse section of the reciprocating gate, with the cutters thereon, taken through the line $x$ $x$ of Fig. 1. Fig. 4 is a view in perspective of one of the lower or foremost cutters, detached, looking toward the front or inner face thereof; Fig. 3, a similar view of the same cutter, looking toward its back or outer face; Fig. 5 is a view in perspective of one of the upper or finishing cutters, looking toward the front or inner face of the same, and Fig. 6 a similar view of the back surface thereof. Fig. 7 is an edge view of a portion of a rail during its process of being tenoned as it appears after the cut made by the foremost tools and previously to its being finished by the after ones, the finished tenon also being shown in red lines.

The various machines heretofore devised for cutting tenons on the ends of rails have been severally defective in their cutting apparatus owing to the time and labor consumed in forming the required tenon. Among the several forms of cutters employed for this purpose are flat and straight nosed chisels which, entering the end of the rail on either side, perform a cutting stroke the width of the tenon for a small portion of its length, and are then returned to their original position to form a continuity of the cut, and so on in succession until the whole length of tenon is cut, the rail being fed up at intervals to each successive cutting stroke of the chisels. This mode of operation is very laborious and tedious, especially when the cutters are operated by hand as is usually the case, and the difficulty of cutting across the grain of the wood—which is necessary in forming tenons,—and friction of the cutters by the jamming of the wood against them, is such, that the chisels are usually made of very prescribed width so as to cut but little at a stroke whereby much time is consumed in the number of strokes requisite to form the full length of tenon. To reduce the cutting resistance by establishing an easier entrance into the wood, bevel nosed chisels have been employed, and some of these have been made with an angular wing branching from their one side for the purpose of what is termed "shouldering" the tenon during their last stroke, but the friction against the sides of these chisels by the jamming of the wood against them, and the resistance they have to encounter in cutting across the grain, alike limits the width of the cutter and renders numerous strokes necessary to form the full length of tenon.

To reduce the labor in tenoning, and consequently economize time, by making a wider cut practicable than is now the case, is the object of my invention.

In the drawing my improved cutting devices are represented as attached to an ordinary reciprocating gate (A), which may be operated, within a frame, by a crank and pitman in the usual way; or it may be variously operated according to the peculiar construction of the machine to which my improved cutting apparatus is designed to be applied. This gate (A) is formed with an oblong slot (*a*) through it, within and through which the end of the rail may be passed while having the tenon cut upon it, the rail being fed up along a stationary bed or table in front as is customary in ordinary and well known tenoning machines; or any other arrangement for carrying the rail and feeding the cut may be adopted.

The cutting tools for forming the tenon are arranged on either side of the slot (*a*), on the front face of the gate, by stocks projecting from the face thereof to which they are bolted: these tools, as the gate descends, dress, simultaneously, either side of the rail, to form the tenon: they are arranged in pairs (B and D), one above the other, and operate in combination somewhat in the manner of the various cutting tools employed in those planing, tonguing and grooving machines that reduce the labor of cutting by causing the front or foremost cutters to only partially perform the cut while the after cutters finish the same, but they differ materially therefrom in their form and construction to adapt them to the different nature of the work to be done and to cut with ease across the grain of the wood, instead of with the grain as in planing, tonguing, &c.

The lower or foremost cutting tools (B) are formed of V shaped cutters (*b*), projecting downward, the hollow faces of which lie inward or face one another and connect, on their front edges, with wing cutters (*c*) branching outward: the lower inner cutting edges of these wing cutters incline downward and outward while the outside faces of them are flat and lie in a plane parallel to the face of the gate. The shanks (*d*) of the tools (B) diverge upward and outward at such inclinations, when bolted to their stocks (C), as to leave an increasing distance upward between the cutters of the two tools; this is made apparent on examination of the space (*e*) that divides the tools, it being wider at the top than the bottom: the object of this increasing distance apart upward is to prevent the hollow or inner faces of the V cutters, and the extensions of those surfaces, from bearing against the wood and producing friction while their lower inclined edges and those of the wing cutters are making the cut, which is effected by the descent of the cutters down either side of the rail that is fed up edgewise, along the bed or table, under the cutters. The two tools (B) are adjustable nearer or farther apart according to the thickness of tenon required, the thickness of the tenon being determined by the distance which separates the upper cutting extremities or angles of the V and wing cutters of the two tools: this adjustability may be effected by making the holes in the stocks, through which the holding bolts (*f*) pass, in the form of oblong slots as is usual for other arrangements of the kind.

Now it is obvious that, upon the end of the rail, to be tenoned, being situated as described, the cutters (*b* and *c*) will form angular incisions as represented in Fig. 7, the wings (*c*) serving to cut a square shoulder to the tenon while the V cutters cut off the outer corners and cut in angularly toward the shoulder, leaving an angular strip (*g*) projecting on either side of the tenon. These angular cuts combined with the easy entrance which is given to the cutters—by reason of their tapering and pointed shapes—render the cut crosswise of the grain but little more laborious than is experienced in working other cutting tools for different purposes that cut with the grain of the wood, which facility in cutting is also partly attributable to the absence of friction on the inner faces of the V cutters by reason of their specified inclined positions preventing pressure of the wood against them, together with the free escape that is presented by the inclined backs of the cutters and the spaces between them for the severed particles to pass off.

In order to remove the angular strips (*g*) left by the foremost tools (B), I attach to the face of the gate, in a similar and adjustable manner, upper dressing or finishing tools (D) that, in the continued descent of the gate, shave off the said strips and form the finished tenon as represented in red lines (Fig. 7): the cutters (*h*) of these tools are of lancet shape projecting downward and distant from one another the required width of the tenon; the points of them are in the same vertical line as the inner angle of the lower V cutters and they are of about the same width at their tops or roots as the V cutters; they are dressed or sharpened from their backs in the manner of a trowel so as to leave sharp cutting edges from their roots toward and at their points. The easy entrance which the cutters (*h*), thus constructed, make into the wood, enables them to sever the angular strips on the sides of the tenon with but a small amount of labor, room being afforded at either side for the wood to expand while being severed and a ready escape being established for the severed particles to pass. Thus, the sides of the tenon, for its entire length, and the shoulder of it may be formed with facility by a single stroke of the gate.

It is not however imperative that the width of the cutting tools should be the length of the required tenon, as, in forming long tenons, two or more consecutive cutting strokes may be made, the rail being fed up so as to enter, and if required, pass through the slot (*a*) of the gate, after the first cutting stroke has been performed, as is usual, but for an enlarged number of strokes, with the narrow cutting tools at present employed and similarly operated. Or, by reason of the easy nature of the cut which is induced by the forms and arrangement of the cutting tools (B and D) herein described, a long tenon may be cut with facility at a single stroke by increasing the width of the cutting tools and forming them with a continuity of two or more V shaped and serrated cutters (*a* and *h*) as represented, by red lines, in Fig. 2.

The various devices for holding the rail to the cut are not here described nor is any minute reference made to the several parts of the machine to which my improved cutting apparatus is applicable as gates, or similar cutter holders, thus operating, are common to most tenoning machines that, being well known, it would be unnecessary to describe, my present invention having exclusive reference to the construction and arrangement of the cutters which, it is evident, may be operated horizontally, vertically or in any suitable manner.

What I claim as new and useful, and desire to secure by Letters Patent, is—

The method herein described of cutting tenons by means of the scoring V shaped cutter, that cuts the square shoulder and point and at the same time scores the side of the tenon, when this is combined with the lancet shaped, or other finishing cutter for removing the material left by the scorers; the whole arranged and combined in the manner specified.

In testimony whereof, I have hereunto subscribed my name.

CHARLES B. FITCH.

Witnesses:
 CHARLES KUMMER,
 THOMAS DAVISON.